US011444843B2

(12) United States Patent
Otte et al.

(10) Patent No.: US 11,444,843 B2
(45) Date of Patent: Sep. 13, 2022

(54) SIMULATING A SYSTEM OF COMPUTING SYSTEMS

(71) Applicant: INTERNATIONAL BUSINESS MACHINES CORPORATION, Armonk, NY (US)

(72) Inventors: Carsten Otte, Stuttgart (DE); Georg Drache, Holzgerlingen (DE); Joachim von Buttlar, Schoenaich (DE); Jens Mehler, Sindelfingen (DE); Sebastian Stork, Vaihingen an der Enz (DE)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 16/701,204

(22) Filed: Dec. 3, 2019

(65) Prior Publication Data
US 2021/0168041 A1    Jun. 3, 2021

(51) Int. Cl.
*H04L 41/14* (2022.01)
(52) U.S. Cl.
CPC .................. *H04L 41/145* (2013.01)
(58) Field of Classification Search
CPC ...................................... H04L 41/145
USPC ........................................................ 703/21
See application file for complete search history.

(56) References Cited

U.S. PATENT DOCUMENTS 6,442,514 B1    8/2002  Le
8,195,774 B2    6/2012  Lambeth
9,590,919 B2    3/2017  Casado
9,729,402 B2 *  8/2017  Schmidt .................. H04L 41/22
2002/0156885 A1  10/2002  Thakkar

FOREIGN PATENT DOCUMENTS

CN    1750485 K1    3/2006
CN    105634902 A    6/2016

OTHER PUBLICATIONS

Adriano_2013 (Implementation of the IEEE 802.21 in the Network Simulator 3, Jun. 2008) (Year: 2008).*
Stallings_1998 (Business Data Communications, Prentice Hall, 1998) (Year: 1998).*
OMNet++_2019 (OMNET++ httpw://omnetpp.org). (Year: 2019).*
Ruddy_2019 (Configuring VMs for Opaque Networks, Feb. 28, 2019) (Year: 2019).*

(Continued)

*Primary Examiner* — Brian S Cook
(74) *Attorney, Agent, or Firm* — Robert D. Bean

(57) ABSTRACT

A computer-implemented method for simulating a system of at least two computing systems connected via at least one data packet connection, wherein a computing system comprises interconnect adapters for physical connections based on a physical layer protocol each. A packet switching component is provided, as are physical attachments for each interconnect adapter. The physical attachments are registered. A connection director is provided for managing the data packet exchange. In response to the receipt of a simulation start indicator, each physical attachment registers its unique address at the package switching component. This assigns unique identifiers for each computing system, and unique identifiers for simulated physical layer protocols.

17 Claims, 9 Drawing Sheets

(56) References Cited

OTHER PUBLICATIONS

Goldenberg_2007 (InfiniBand Technology Overview SNIA, 2007) in view of Chen_2012 (PCI Express-based Ethernet Switch, Arizona State University May 2012). (Year: 2012).*
Kalin_2017 (Simulating IoT Frameworks and Devices in the Smart Home, Aug. 10, 2017 Virginia Polytechnic Institute). (Year: 2017).*
MCT_OVR_2002 (Ip Multicast Technology Overview 2002). (Year: 2002).*
Spurgeon_2019 (Ethernet Switches Chapter 1. Basic Switch Operation, Oreilly 2019). (Year: 2019).*
Dunkels_2019 (IVIP API TCP/IP Interface, https://www.nongnu.org/iwip/2_0_x/raw_api.html Feb. 21, 2019). (Year: 2019).*
Chen_2012 (PCI Express-based Ethernet Switch, Arizona State University May 2012). (Year: 2012).*
OpenFlow_Spec_2009 (OpenFlow Switch Specification ONF TS-001 Dec. 31, 2009) (Year: 2009).*
Ahrenholz et al., "Core: A Real-Time Network Emulator", © 2008 IEEE, Conference Paper, Nov. 2008, 8 pages.
Judd, "Using Physical Layer Emulation To Understand and Improve Wireless Networks", CMU-CS-06-164, Oct. 2006, Copyright 2006 Glenn Judd, School of Computer Science, Carnegie Mellon University, Pittsburgh, PA, 187 pages.

* cited by examiner

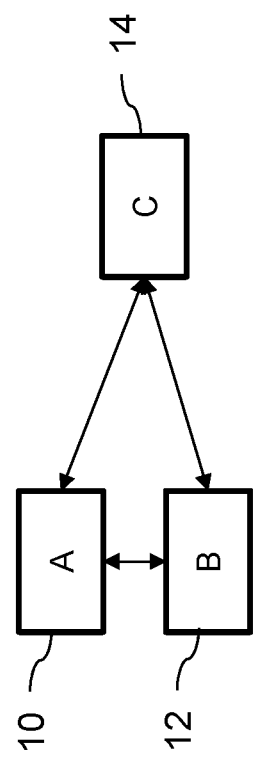
Fig. 3
Fig. 4

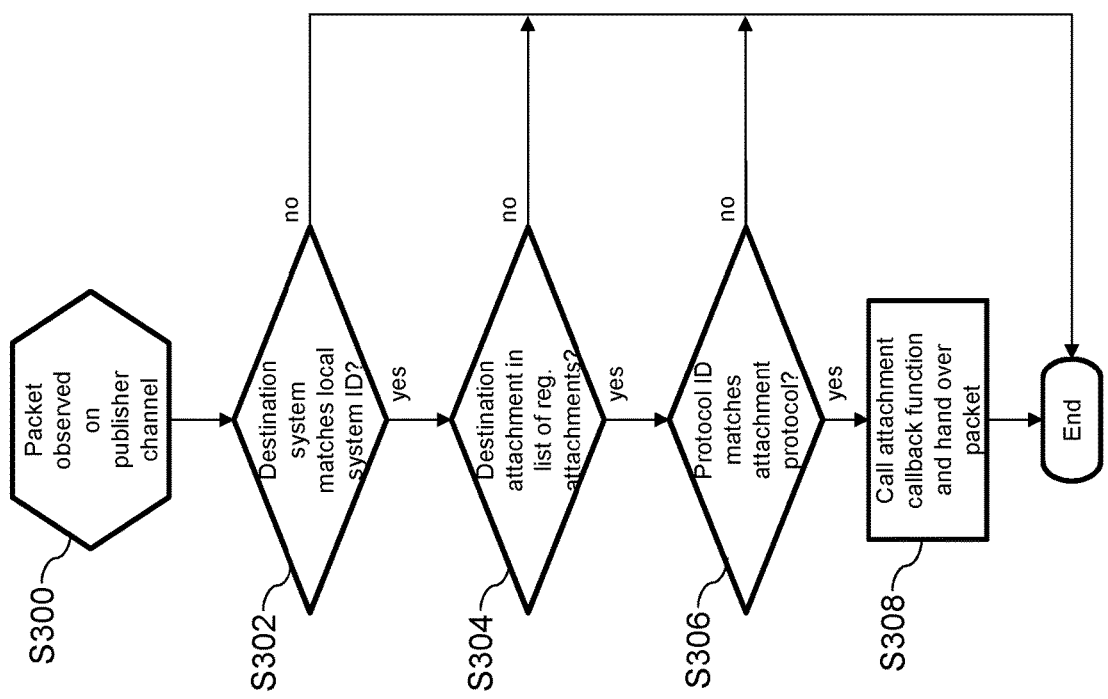

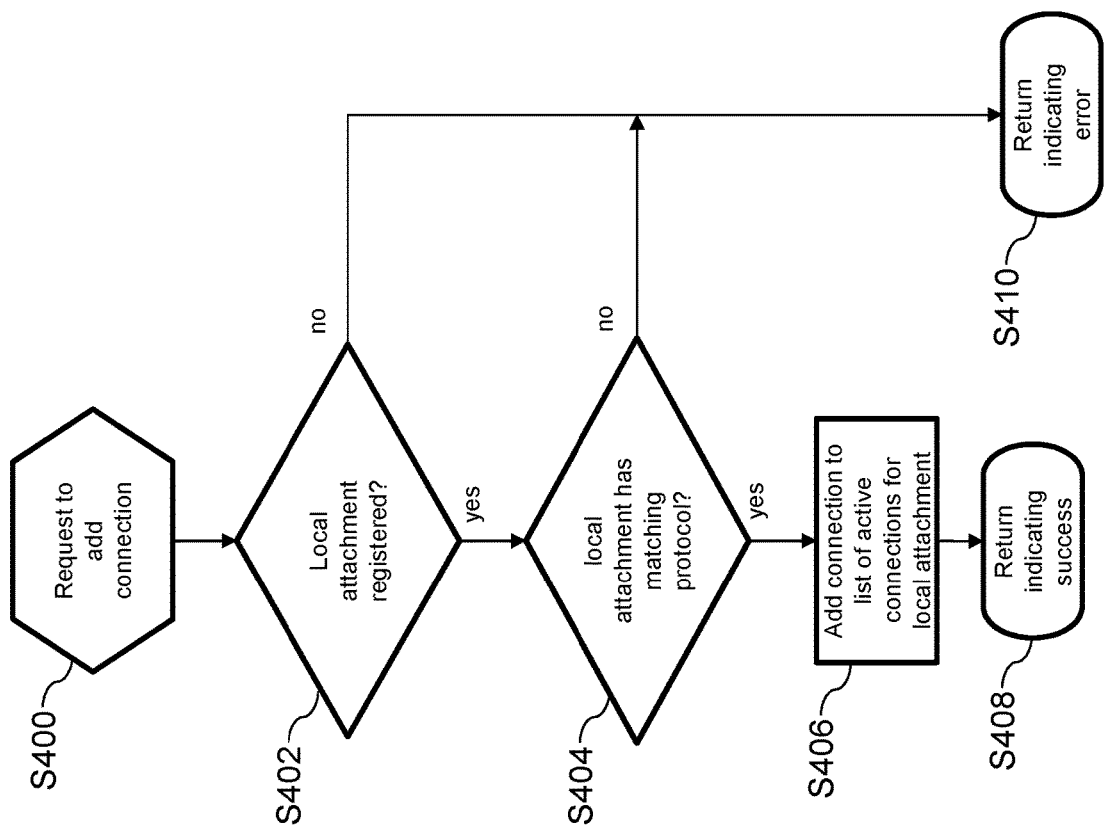

SIMULATING A SYSTEM OF COMPUTING SYSTEMS

The present invention relates in general to data processing systems, and in particular, to simulating a system of computing systems connected via data packet connections.

BACKGROUND

Multiple network physical layer protocols can be used to transport data between computing systems. Simulating physical layer interconnects between computing systems allow testing and debugging issues related to the interaction between the computing systems. Purpose built software infrastructure can be used to simulate the physical interconnects, implementing specific knowledge about the topologies and/or physical layer protocols. A generic transport infrastructure that can handle different physical layer transports and arbitrary topologies, can implement new physical layer transports without having to change the transport infrastructure.

SUMMARY

A computer-implemented method is provided for simulating a system of at least two computing systems connected via at least one data packet connection. The method provides a packet switching component for each computing system to receive and send data packets from and to the computing system, respectively. The method provides for assigning addresses in accordance with the corresponding physical layer protocols such that the addresses are unique on the corresponding computing system. The method registers the physical attachments for each computing system at the packet switching component corresponding to the respective computing systems. The method provides for managing the data packet exchange between physical attachments on different computing systems. In response to receiving a simulation start indicator, registering each physical attachment unique address at the package switching component, and assigning unique identifiers for each computing system.

An embodiment of the invention provides an abstraction of a network that separates the network structure and the physical implementation of a network protocol layer for each connection. Once the physical protocol layer of a network connection is modelled in protocol specific device models, the connections between these device models can be specified and orchestrated separately.

An embodiment of the invention provides a simulation of a cluster of computer servers connected via different physical protocols. Another embodiment provides an internet-of-things (IoT) infrastructure simulation.

A computer program product is provided for simulating a system of at least two computing systems connected via at least one data packet connection. The computer program product comprises a computer readable storage medium having program instructions embodied therewith, the program instructions executable by the computer system to cause the computer system to perform a method comprising: providing a packet switching component for each computing system to receive and send data packets from and to the computing system, respectively; providing physical attachments for each interconnect adapter and assigning addresses in accordance with the corresponding physical layer protocols such that the addresses are unique on the corresponding computing system; registering the physical attachments for each computing system at the packet switching component corresponding to the respective computing systems; providing a connection director for managing the data packet exchange between physical attachments on different computing systems; and in response to the receipt of a simulation start indicator, each physical attachment registering its unique address at the package switching component, further assigning unique identifiers for each computing system, and unique identifiers for simulated physical layer protocols.

A computer system is provided, comprising one or more processors, one or more computer-readable storage devices, and a plurality of program instructions stored on at least one of the one or more storage devices for execution by at least one of the one or more processors, the plurality of program instructions comprising: providing a packet switching component for each computing system to receive and send data packets from and to the computing system, respectively; providing physical attachments for each interconnect adapter and assigning addresses in accordance with the corresponding physical layer protocols such that the addresses are unique on the corresponding computing system; registering the physical attachments for each computing system at the packet switching component corresponding to the respective computing systems; providing a connection director for managing the data packet exchange between physical attachments on different computing systems; and in response to the receipt of a simulation start indicator, each physical attachment registering its unique address at the package switching component, further assigning unique identifiers for each computing system, and unique identifiers for simulated physical layer protocols.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

FIG. 3 depicts a simulated system with a point-to-point topology according to an embodiment of the invention.

FIG. 4 depicts a simulated system with bus/shared medium topology according to a further embodiment of the invention.

FIG. 9 depicts a flow chart for receiving a data packet according to an embodiment of the invention.

FIG. 10 depicts a flow chart for adding a data packet connection to a sending computing system according to an embodiment of the invention.

DETAILED DESCRIPTION

Figure 1:
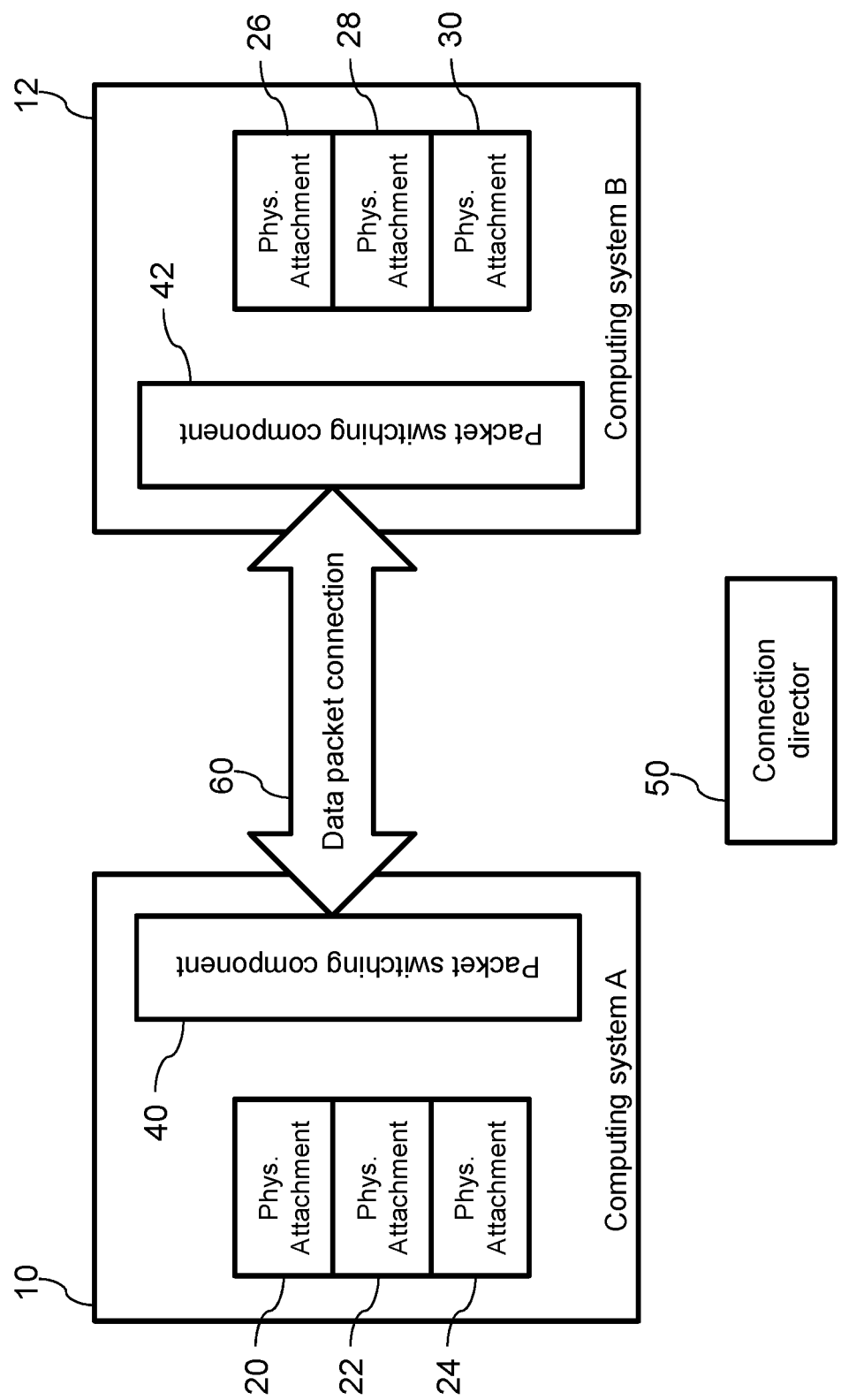
FIG. 1 depicts a schematic configuration of a simulated system with two computing systems according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The embodiments described herein provide a method for simulating a system of at least two computing systems connected via at least one data packet connection, wherein a computing system comprises interconnect adapters (i.e., physical attachment) for physical connections based on a physical layer protocol each. The embodiments can provide a packet switching component for each computing system to receive and send data packets from and to the computing system, respectively. The data packets comprise at least a payload data segment for actual data. Physical attachments are provided for each interconnect adapter and addresses are assigned in accordance with the corresponding physical layer protocols such that the addresses are unique on the corresponding computing system. Physical attachments for each computing system are registered at the packet switching component corresponding to the respective computing systems. A connection director is provided for managing the data packet exchange between physical attachments on different computing systems. In response to receiving a simulation start indicator, each physical attachment registers its unique address at the package switching component, further assigning unique identifiers for each computing system, and unique identifiers for simulated physical layer protocols.

The illustrative embodiments are sometimes described herein using particular technologies only as an example for the clarity of the description.

FIG. 1 depicts a schematic configuration of a simulated system with two computing systems 10, 12 according to an embodiment of the invention. The two simulated computing systems 10, 12 are connected via at least one data packet connection 60. The computing systems 10, 12 comprise interconnect adapters for physical connections based on a physical layer protocol each.

A packet switching component 40, 42 is provided for each computing system 10, 12 to receive and send data packets from and to the computing system 10, 12 respectively. The data packets comprise at least a payload data segment for actual data. A metadata segment for physical layer protocol specific metadata can be optional. For example, for PCI or Ethernet protocol, such a metadata segment may be used, but in order to simulate point to point attachments such as HDMI or serial ports physical protocol specific metadata segments are not required.

Physical attachments 20, 22, 24, 26, 28, 30 are provided for each interconnect adapter, and addresses are assigned in accordance with the corresponding physical layer protocols such that the addresses are unique on the corresponding computing system 10, 12.

The physical attachments 20, 22, 24, 26, 28, 30 are registered for each computing system 10, 12 at the packet switching component 40, 42 corresponding to the respective computing systems 10, 12.

A connection director 50 is provided for managing the data packet exchange between physical attachments 20, 22, 24, 26, 28, 30 on different computing systems 10, 12.

In response to the receipt of a simulation start indicator, each physical attachment 20, 22, 24, 26, 28, 30 registers its unique address at the package switching component 40, 42, further assigning unique identifiers for each computing system 10, 12, and unique identifiers for simulated physical layer protocols. The unique addresses for each physical attachment 20, 22, 24, 26, 28, 30 are not assigned by the connection director 50. Instead they are registered by the physical attachment 20, 22, 24, 26, 28, 30 itself, using a unique identifier. For example, a unique MAC address is associated with an Ethernet adapter. Unique identifiers for each computing system 10, 12 may be managed by the connection director 50, or assigned manually on startup of each computing system simulator, e.g. specified in its config file. As another example, a unique identifier of the simulated computer system 10, 12, can be an IP address optionally in combination with a port number.

In an embodiment, the system of at least two computing systems 10, 12 may comprise a cluster of computer servers. The two computing systems 10, 12 may be connected via multiple packet-switched networks, such as the data packet connection 60, wherein each computing system 10, 12 may comprise network adapters for different types of physical networks with different physical layer protocols each.

Exemplary physical layer protocols include an Ethernet protocol, a PCI protocol, a Fibre Channel protocol, and an InfiniBand protocol.

The system can comprise multiple computing systems 10, 12, 14, 16. Exemplary connections among the multiple computing systems include a data bus connection, a point-to-point connection, a switched networking connection, and a token ring connection.

In an embodiment, a protocol agnostic and dynamically re-configurable network infrastructure can be simulated. Simulating a network infrastructure can involve several participants (i.e., nodes, devices) running multiple protocols over multiple connections. A node refers to a network endpoint that is addressable through a network connection. A participant, i.e., a node, can simulate several actions on the network infrastructure, such as a disconnected connection (for example, from a disconnected network cable), a connection time out, lost packets from an unstable connection, and opening a port for creating a connection to another participant. Network connections can be added, reconfigured, and removed from the network. A port can be reconfigured and removed. A network protocol can be defined and reconfigured. Several connections among the participants can run simultaneously.

One or several observer instances may be used for controlling the simulation environment. Those observers are not part of the simulated environment, but may communicate with the network entities using remote procedure calls to provoke the needed behaviour. The communication between the network entities can run over a raw byte stream that is able to represent any desired protocol.

In response to the receipt of a data packet from another computing system 10, 12 the receiving packet switching component 40, 42 of a computing system 10, 12 can notify the corresponding registered physical attachment 20, 22, 24, 26, 28, 30 about the data packet being available.

For registering the physical attachments 20, 22, 24, 26, 28, 30 for each computing system 10, 12 at the packet switching component 40, 42 information can be provided on a supported physical layer protocol, such as Ethernet protocol; a unique local address specific to the physical layer protocol, as e.g. a MAC address if using an Ethernet I/F card; and a callback function for notifications about inbound data packets.

The packet switching component 40, 42 can provide a base class as a package with opaque data representation. Protocol specific extensions can implement protocol specific data fields. This allows network transport using different physical layer protocols without requiring modification of the package switching infrastructure.

The packet switching components 40, 42 may provide an API (application programming interface) to the physical attachments 20, 22, 24, 26, 28, 30 to simulate physical attachments for receiving inbound data packets and sending outbound data packets using the opaque packet format.

The connection director 50 can instruct the packet switching components 40, 42 to forward traffic for one registered physical attachment 20, 22, 24, 26, 28, 30 to another physical attachment 20, 22, 24, 26, 28, 30. The forwarded traffic can include a unique local address for a physical attachment 20, 22, 24, 26, 28, 30, and a unique identifier of the target simulated computing system 10, 12, (e.g., an Ethernet address). However, the target can be local to the sender or remote. The forwarded traffic can include a unique address of the target physical attachment 20, 22, 24, 26, 28, 30, and optionally a unique protocol identifier for verification of compatibility.

In response to a request from the connection director 50, the receiving packet switching components 40, 42 can perform multicast transfers between physical attachments 20, 22, 24, 26, 28, 30. Multicasting transfers can be used for certain type of topologies, e.g., for a bus infrastructure or a shared medium topology. For a point-to-point topology or a token ring topology, e.g., multicasting is not necessary.

This allows to simulate arbitrary topologies such as data bus, point to point connection, switched networking or any other form of mash-up without the need to change the packet switching components 40, 42.

For simulation of complex packet routing, physical attachments 20, 22, 24, 26, 28, 30 may receive all the packets assigned to them by the connection director 50, and may choose to discard parts of it. For example, when simulating an Ethernet switch, physical attachments 20, 22, 24, 26, 28, 30 may discard all traffic that does not address their MAC address.

As the packet switching component 40, 42 may provide a base class with opaque packet data representation, physical layer protocol specific extensions may derive the base class and implement protocol specific data fields. This allows to transport different physical layer protocols without the need to change the packet switching components 40, 42.

Figure 2:
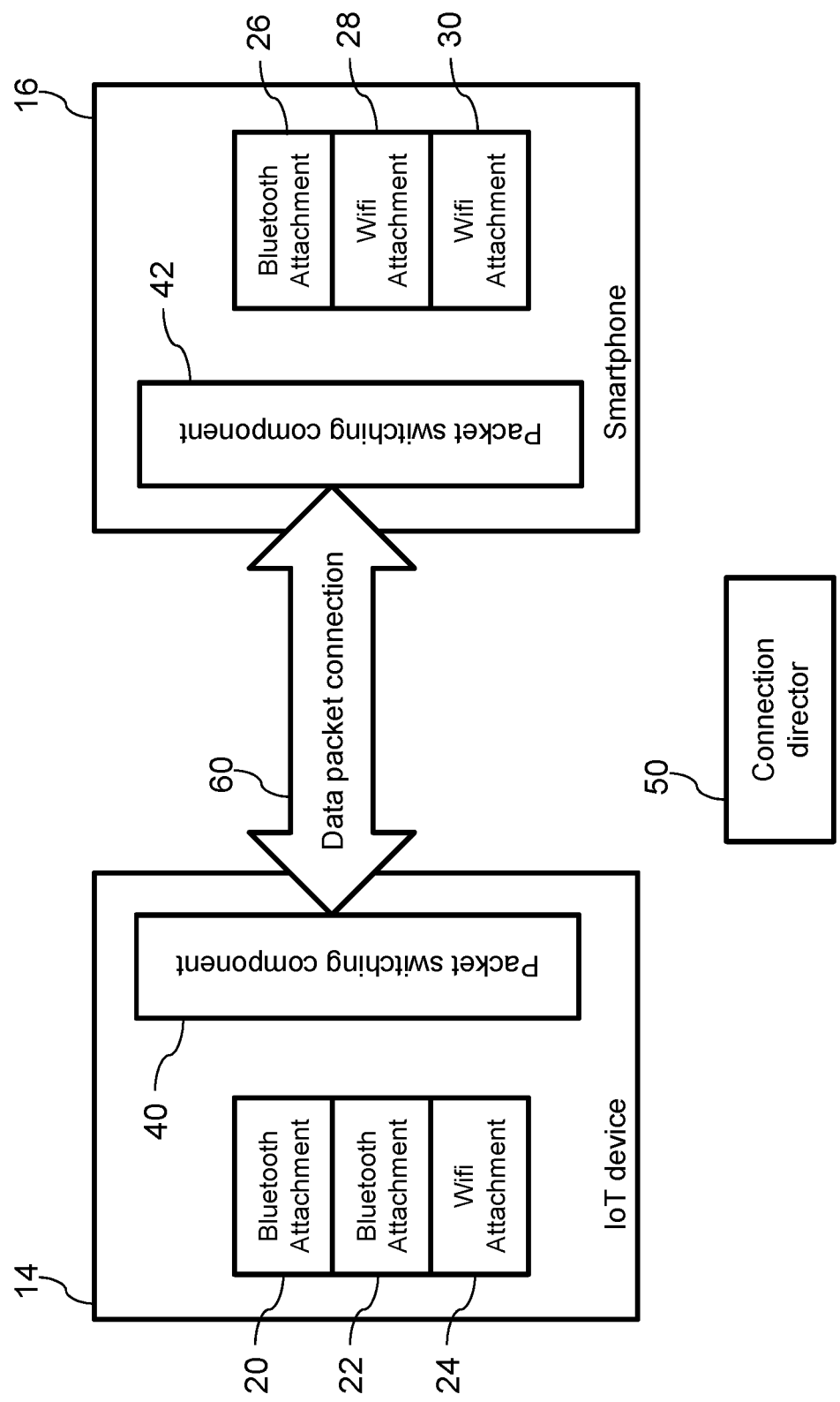
FIG. 2 depicts a schematic configuration of a simulated system with an internet of things infrastructure according to a further embodiment of the invention.

FIG. 2 depicts a schematic configuration of a simulated system with an internet of things (IoT) infrastructure according to an embodiment of the invention. The simulated system of at least two computing systems 14, 16 comprises an IoT infrastructure, featuring a simulated IoT device as a first computing system 14 and a simulated smartphone as a second computing system 16.

Physical attachments may comprise Bluetooth attachments 20, 22, 26 and Wifi attachments 24, 28, 30.

FIGS. 3 to 6 depict possible simulated systems with multiple computing systems 10, 12, 14, 16 according to embodiments of the invention for different topologies.

Figure 5:
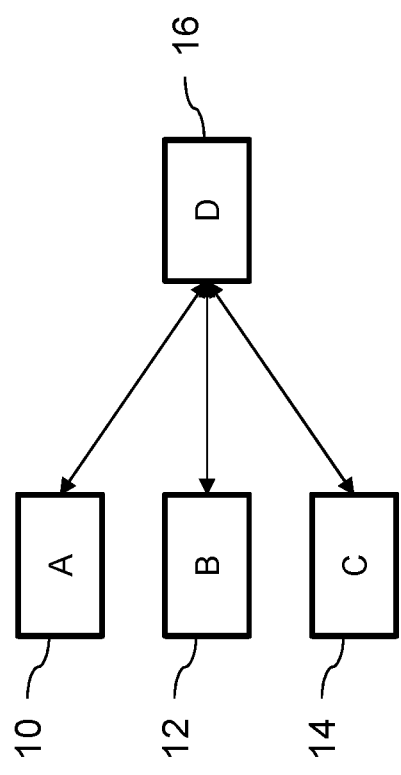
FIG. 5 depicts a simulated system with a star topology according to a further embodiment of the invention.
Figure 6:
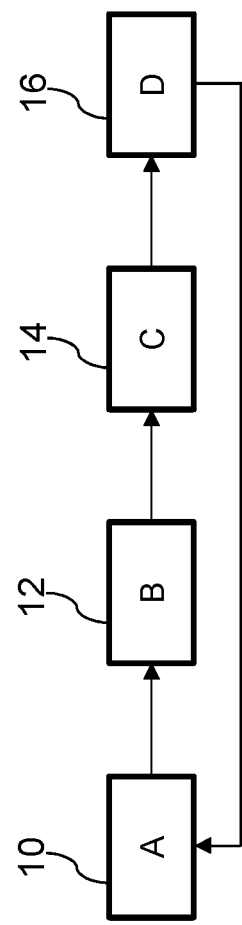
FIG. 6 depicts a simulated system with a token ring topology according to a further embodiment of the invention.

FIG. 3 depicts a simulated system with a point-to-point topology. FIG. 4 is a bus/shared medium topology. FIG. 5 is a star topology. FIG. 6 a token ring topology.

FIG. 3 represents a duplex connection where data packets can be sent from computing system 10 to 12 and vice versa.

FIG. 4 represents a bus/shared medium topology where data packets can be sent in duplex connections between computing systems 10 and 12, as well as between computing systems 10 and 14, and between 12 and 14, respectively.

FIG. 5 represents a star topology where data packets can be sent in duplex connections between computing systems 16 and 10, as well as between computing systems 16 and 12, and between computing systems 16 and 14.

FIG. 6 represents a token ring topology where data packets can be sent in unidirectional (simplex) connections from computing system 10 to computing system 12, from computing system 12 to computing system 14, from computing system 14 to computing system 16 and from computing system 16 back to computing system 10.

Figure 7:
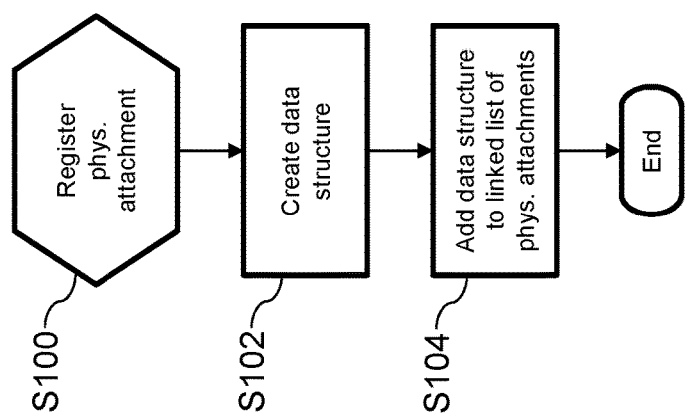
FIG. 7 depicts a flow chart for registering a physical attachment according to an embodiment of the invention.

FIG. 7 depicts a flow chart for registering a physical attachment 20, 22, 24, 26, 28, 30 according to an embodiment of the invention.

In step S100 the physical attachments 20, 22, 24, 26, 28, 30 are registered for a computing system 10, 12, 14, 16 at the respective packet switching component 40, 42. The registration parameters includes the physical layer protocol, the local address of the physical attachments 20, 22, 24, 26, 28, 30 and the callback function for notifications about inbound traffic. In step S102, a data structure with these parameters is created. In step S104, the data structure is added to a linked list of physical attachments 20, 22, 24, 26, 28, 30 of the packet switching components 40, 42.

Figure 8:
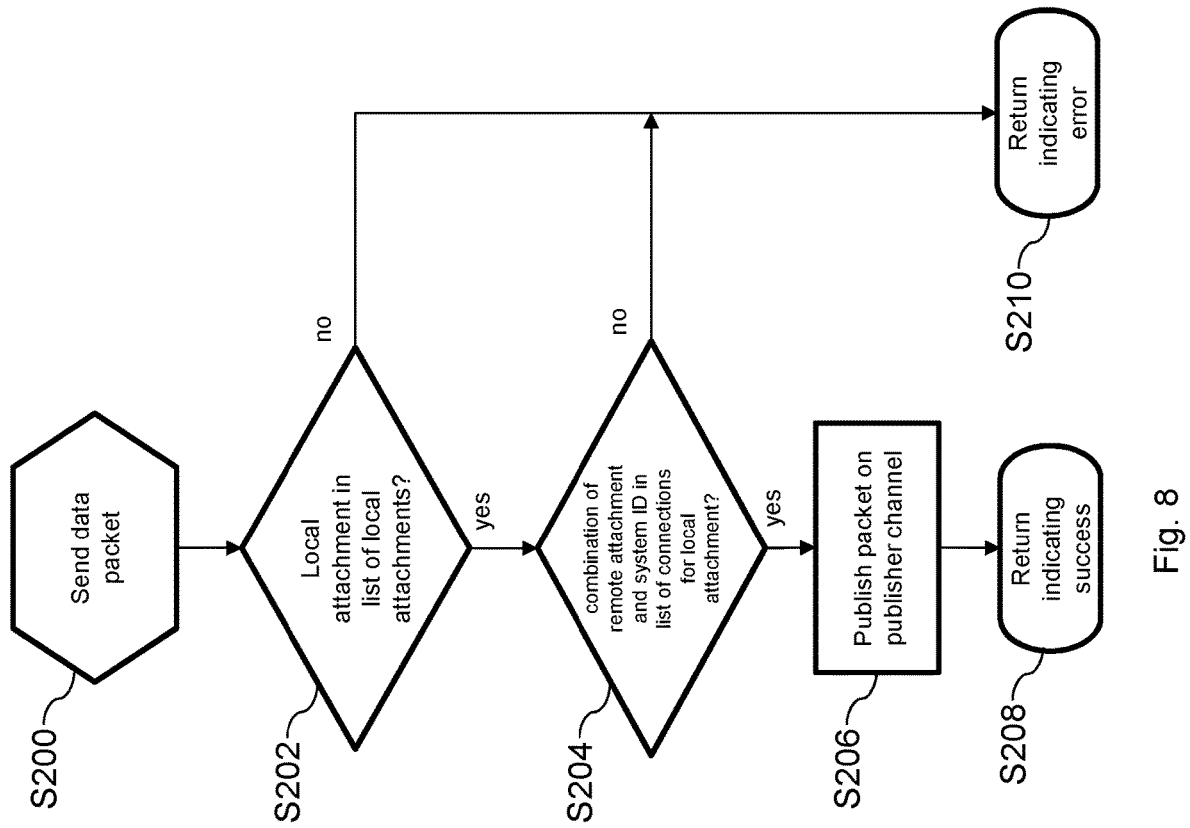
FIG. 8 depicts a flow chart for sending a data packet according to an embodiment of the invention.

FIG. 8 depicts a flow chart for sending a data packet by a computing system 10, 12, 14, 16 according to an embodiment of the invention.

In step S200, a data packet is sent, comprising optionally, and depending on the physical attachment, a metadata segment with at least the physical layer protocol, the local physical attachment 20, 22, 24, 26, 28, 30, the destination physical attachment 20, 22, 24, 26, 28, 30, the destination computing system 10, 12, 14, 16, and a payload data segment with the opaque data. In step S202 the connection director 50 verifies that a local physical attachment 20, 22, 24, 26, 28, 30 is in the list of local physical attachments 20, 22, 24, 26, 28, 30. If this is the case, in step S204 the connection director 50 verifies that a combination of the remote physical attachment 20, 22, 24, 26, 28, 30 and the identifier of the remote computing system 10, 12, 14, 16 is in the list of data packet connections 60 for the local physical attachment 20, 22, 24, 26, 28, 30. If this is the case, the data packet is published on a publisher channel of the respective computing system 10, 12, 14, 16 in step S206. The publisher channel is a general broadcasting channel of the system. In step S208, the process returns to the sending computing system 10, 12, 14, 16 indicating success.

If either of steps S202 or S204 is not successful, the process returns to the sending computing system 10, 12, 14, 16 indicating error in step S210.

FIG. 9 depicts a flow chart for receiving a data packet by a computing system 10, 12, 14, 16 according to an embodiment of the invention.

In step S300, a data packet is observed on the publisher channel, where the respective computing system 10, 12, 14, 16 is connected. The respective computing system 10, 12, 14, 16 receives the optional metadata segment with at least the physical layer protocol, the local physical attachment 20, 22, 24, 26, 28, 30, the destination physical attachment 20, 22, 24, 26, 28, 30, the destination computing system 10, 12, 14, 16, and the payload data segment with the opaque data. In step S302 the connection director 50 verifies that the destination computing system 10, 12, 14, 16 matches the identifier of the local computing system 10, 12, 14, 16, followed, if successful, by verifying that the destination physical attachment 20, 22, 24, 26, 28, 30 is in the list of registered physical attachments 20, 22, 24, 26, 28, 30 in step S304.

If this is the case, then in step S306 the connection director 50 verifies that the identifier of the physical layer protocol matches the physical layer protocol of the destination physical attachment 20, 22, 24, 26, 28, 30. If this is the case, in step S308 a callback function of the destination physical attachment 20, 22, 24, 26, 28, 30 is called and the data packet is handed over.

If either of steps S302, S304 or S306 is not successful the process is ended.

FIG. 10 depicts a flow chart for adding a data packet connection 60 to a sending computing system 10, 12, 14, 16 according to an embodiment of the invention. Adding the data packet connection 60 is performed by the connection director 50.

In step S400, a request to add a data packet connection 60 is received by the computing system 10, 12, 14, 16. The request includes the local physical attachment 20, 22, 24, 26, 28, 30, the identifier of the remote computing system 10, 12, 14, 16, the remote physical attachment 20, 22, 24, 26, 28, 30, and the physical layer protocol. In step S402, the connection director 50 verifies that the local physical attachment 20, 22, 24, 26, 28, 30 is registered in the list of registered physical attachments 20, 22, 24, 26, 28, 30. If this is the case, the connection director 50 verifies in step S404 that the local physical attachment 20, 22, 24, 26, 28, 30 has the matching physical layer protocol, followed, if successfully, by adding the data packet connection 60 to a list of active connections 60 for the local physical attachment 20, 22, 24, 26, 28, 30 in step S406. Then in step S408 the process is ended by indicating success.

If either of steps S402 or S404 is not successful, the process is ended by indicating error in step S410.

Figure 11:
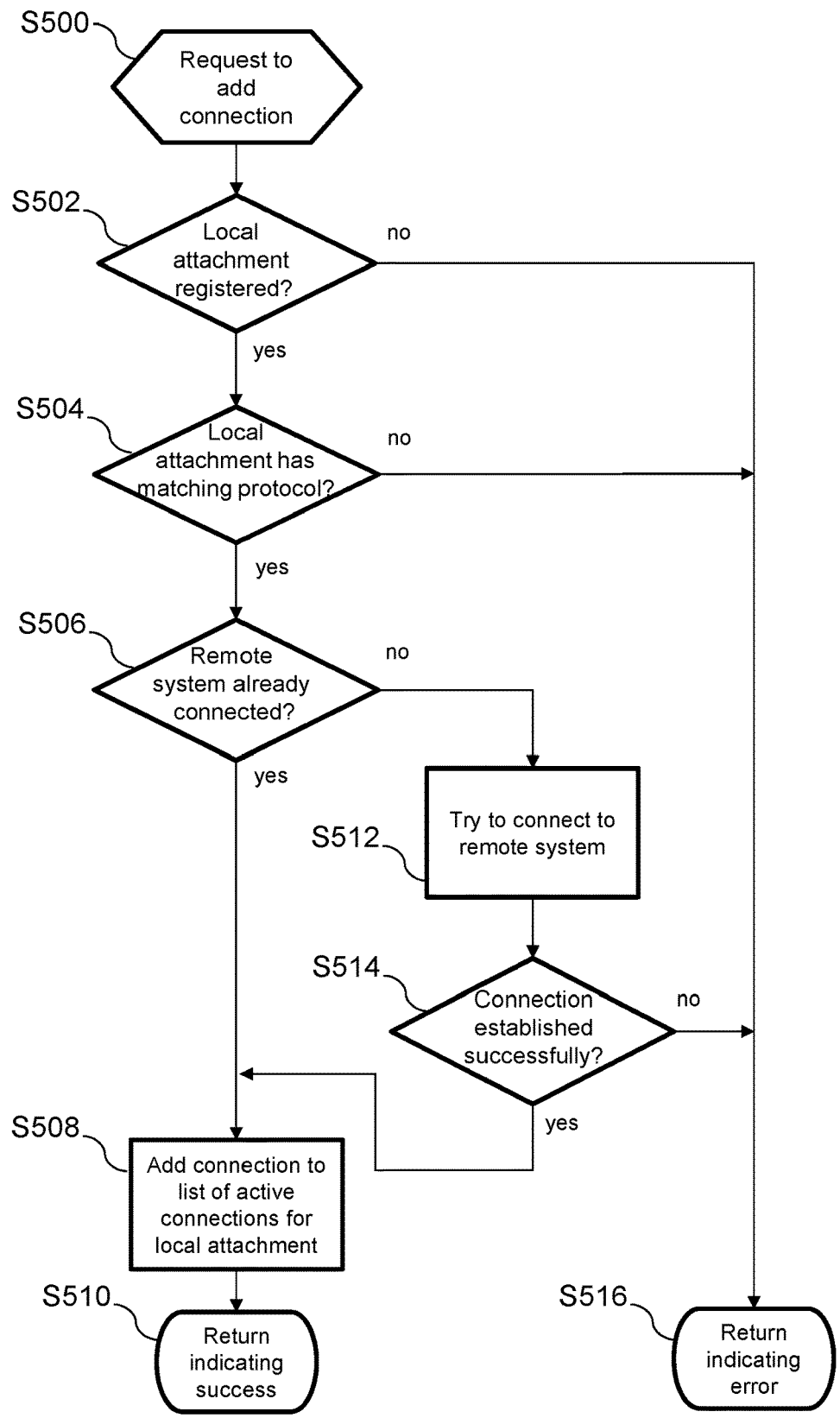
FIG. 11 depicts a flow chart for adding a data packet connection to a receiving computing system according to an embodiment of the invention.

FIG. 11 depicts a flow chart for adding a data packet connection 60 to a receiving computing system 10, 12, 14, 16 according to an embodiment of the invention. Adding the data packet connection 60 is performed by the connection director 50.

In step S500, a request to add a data packet connection 60 is received by a computing system 10, 12, 14, 16. The request includes the local physical attachment 20, 22, 24, 26, 28, 30, the identifier of the remote computing system 10, 12, 14, 16, the remote physical attachment 20, 22, 24, 26, 28, 30, and the physical layer protocol. In step S502 the connection director 50 verifies that the local physical attachment 20, 22, 24, 26, 28, 30 is registered in the list of registered physical attachments 20, 22, 24, 26, 28, 30. If this is the case, the connection director 50 verifies in step S504 that the local physical attachment 20, 22, 24, 26, 28, 30 has a matching physical layer protocol. If this is the case, the connection director 50 verifies in step S506 that the remote computing system 10, 12, 14, 16 is already connected. If this is not the case, connecting to the remote computing system 10, 12, 14, 16 is attempted in step S512, followed by verifying that the data packet connection 60 is established successfully in step S514.

If the steps S506 or S514 are successful, then, in step S508, the data packet connection 60 is added to the list of active connections 60 for the local physical attachment 20, 22, 24, 26, 28, 30, followed by ending the process by indicating success in step S510.

If either of steps S502, S504 or S514 is not successful the process is ended by indicating error in step S516.

Figure 12:
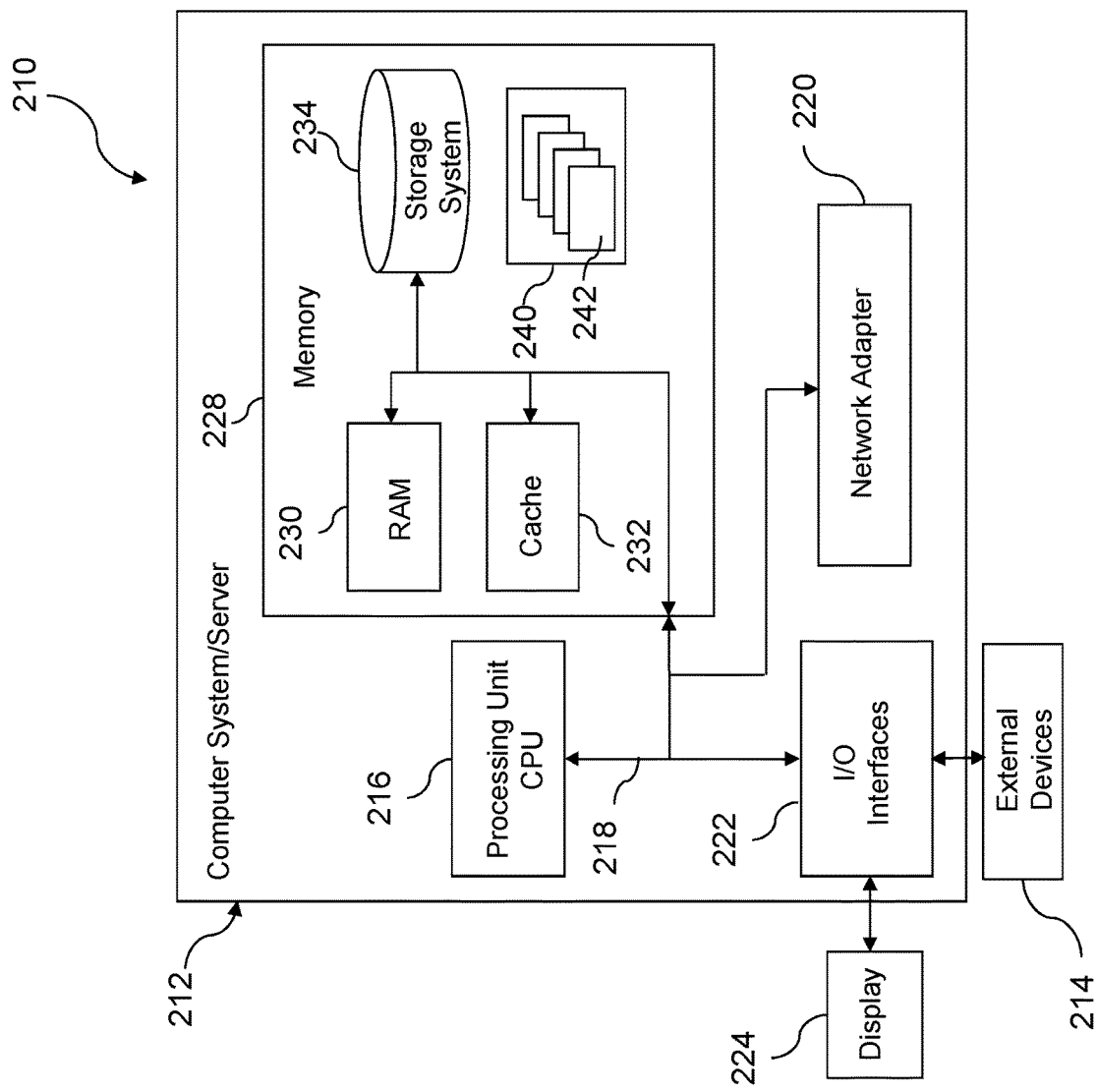
FIG. 12 depicts an example embodiment of a data processing system for executing a method according to the invention.

Referring now to FIG. 12, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Simulated physical attachments register at the package switching infrastructure with the following information: Supported physical layer protocol; Unique local address specific to physical layer protocol (e.g. pci://busID.functionID, or parallel sysplex port name); and Callback function for notifications about inbound traffic. Package switching infrastructure provides API to simulated physical attachments that allows to receive inbound traffic and send outbound traffic using an opaque package format. Connection director instructs package switching infrastructure to forward traffic for one registered attachment to another attachment, providing: Unique local address for attachment; Unique ID of target simulated computing system (may be local to the sender, or remote); Unique address of target attachment; and Unique Protocol ID for verification of compatibility.

Package switching infrastructure can multi-cast output to multiple physical attachments when instructed by connection director. This allows to simulate arbitrary topologies such as data bus, point to point connection, switched networking or any other form of mash-up without the need to change the package switching infrastructure. For simulation of complex package routing, physical attachments do receive all the packages assigned to them by the connection director, and can choose to discard parts of it. E.g. when simulating an Ethernet switch, physical attachments may discard all traffic that does not address their MAC address. Package infrastructure provides base class with opaque data representation. Protocol specific extensions can derive base class, and implement protocol specific data fields. This allows to transport different physical layer protocols without the need to change the package switching infrastructure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   interconnecting a plurality of computer systems by a fixed physical network comprising one or more different physical network protocols, wherein each different network protocol comprises a physical network adapter of a type corresponding to the network protocol, and wherein each physical network adapter is assigned a unique physical network address, in a format corresponding to the network protocol;
   registering each unique physical network address at a packet switching component of physical attachments, wherein there is the packet switching component at each one of the plurality of computer systems;
   in response to receiving an indicator to begin a network simulation, registering a simulated configuration, comprising a unique identifier for each computer system, and unique identifiers for simulated physical layer protocols; and
   based on the simulated configuration, one or more observer instances initiating exchanging data packets, wherein the data packets include at least a payload data segment for data and a metadata segment for physical layer protocol specific metadata.

2. The method according to claim 1, wherein physical connections between the computing systems include: a data bus connection, a point-to-point connection, a switched networking connection, and a token ring connection, and wherein it is not required that simulated connections between the computing systems are among the physical connections between the computing systems.

3. The method according to claim 1, wherein each of the plurality of physical computing systems is connected via multiple physical packet-switched networks, and wherein each of the plurality of computing systems include physical network adapters for different types of physical networks, each physical network adapter having a different physical layer protocol, and wherein it is not required that simulated network adapters are among the physical network adapters.

4. The method according to claim 1, further comprising:
   in response to receiving the data packet from one of the plurality of computing systems, the receiving packet switching component of the receiving computing system notifying the corresponding registered physical attachment about the data packet being available.

5. The method according to claim 1, further comprising:
   in response to a request from the connection director, the receiving packet switching component being configurable to perform multicast transfers between physical attachments.

6. The method according to claim 1, further comprising:
   registering the physical attachments for each of the plurality of computing systems at the packet switching component, wherein parameters include:
   a supported physical layer protocol;

a unique local address specific to the physical layer protocol; and a callback function for notifications about inbound data packets.

7. The method according to claim 1, wherein the packet switching component provides a base class with opaque packet data representation.

8. The method according to claim 7, wherein the packet switching component provides an API to physical attachments allowing to receive inbound data packets and to send outbound data packets using the opaque packet representation, wherein the inbound and outbound data packets simulate connections between physical computing systems, and wherein it is not required that the simulated connections are among the physical connections between the computing systems.

9. The method according to claim 7, wherein physical layer protocol specific extensions derive the base class and implement protocol specific data fields.

10. The method according to claim 1, wherein the registering the physical attachments further comprises:

registering the physical attachments for each of the plurality of computing systems at the packet switching component;

creating a data structure with parameters; and adding the data structure to a linked list of physical attachments of the packet switching component.

11. The method according to claim 1, wherein the sending the data packet further comprises:

sending the data packet;

verifying that a local physical attachment is in a list of local physical attachments;

verifying that a combination of a remote physical attachment and an identifier of a remote computing system is in a list of data packet connections for the local physical attachment;

publishing the data packet on a publisher channel of the respective computing system.

12. The method according to claim 1, wherein the receiving the data packet further comprises:

observing a data packet on a publisher channel of the respective computing system;

verifying that a destination computing system matches the identifier of the local computing system;

verifying that a destination physical attachment is in a list of registered physical attachments;

verifying that an identifier of a physical layer protocol matches the physical layer protocol of the destination physical attachment; and calling a callback function of the destination physical attachment and transferring the data packet to the callback function.

13. The method according to claim 1, wherein the adding the data packet connection to a sending computing system by the connection director comprising comprises:

requesting to add the data packet connection;

verifying that a local physical attachment is registered in a list of registered physical attachments;

verifying that the local physical attachment has a matching physical layer protocol; and adding the data packet connection to a list of active connections for the local physical attachment.

14. The method according to claim 1, wherein adding the data packet connection to a receiving computing system by the connection director comprises:

requesting to add a data packet connection;

verifying that a local physical attachment is registered in a list of registered physical attachments;

verifying that the local physical attachment has a matching physical layer protocol;

verifying that the remote computing system is already connected; if this is not the case, trying to connect to the remote computing system; and adding the data packet connection to a list of active connections for the local physical attachment.

15. The method of claim 1, wherein registering comprises adding a structure for each physical network adapter to a linked list on the packet switching component of physical attachments, wherein the structure comprises: physical network protocol, the unique physical network address of the physical network adapter, and a callback function.

16. A computer program product for simulating a system of a plurality of computing systems connected via at least one data packet connection, the computer program product comprising a computer readable storage medium having program instructions embodied therewith, the program instructions executable by the computer system to cause the computer system to perform a method comprising:

interconnecting a plurality of computer systems by a fixed physical network comprising one or more different physical network protocols, wherein each different network protocol comprises a physical network adapter of a type corresponding to the network protocol, and wherein each physical network adapter is assigned a unique physical network address, in a format corresponding to the network protocol;

registering each unique physical network address at a packet switching component of physical attachments, wherein there is the packet switching component at each one of the plurality of computer systems;

in response to receiving an indicator to begin a network simulation, registering a simulated configuration, comprising a unique identifier for each computer system, and unique identifiers for simulated physical layer protocols; and exchanging data packets as specified in the simulated configuration, wherein the data packets include at least a payload data segment for data and a metadata segment for physical layer protocol specific metadata.

17. A computer system comprising one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

interconnecting a plurality of computer systems by a fixed physical network comprising one or more different physical network protocols, wherein each different network protocol comprises a physical network adapter of a type corresponding to the network protocol, and wherein each physical network adapter is assigned a unique physical network address, in a format corresponding to the network protocol;

registering each unique physical network address at a packet switching component of physical attachments, wherein there is the packet switching component at each one of the plurality of computer systems;

in response to receiving an indicator to begin a network simulation, registering a simulated configuration, comprising a unique identifier for each computer system, and unique identifiers for simulated physical layer protocols; and exchanging data packets as specified in the simulated configuration, wherein the data packets include at least a payload data segment for data and a metadata segment for physical layer protocol specific metadata.

* * * * *